United States Patent
Everitt et al.

(10) Patent No.: US 7,145,565 B2
(45) Date of Patent: Dec. 5, 2006

(54) DEPTH BOUNDS TESTING

(75) Inventors: Cass W. Everitt, Pflugerville, TX (US); Mark J. Kilgard, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 404 days.

(21) Appl. No.: 10/444,655

(22) Filed: May 23, 2003

(65) Prior Publication Data
US 2004/0169651 A1    Sep. 2, 2004

Related U.S. Application Data

(60) Provisional application No. 60/451,311, filed on Feb. 27, 2003.

(51) Int. Cl.
*G06T 15/50*  (2006.01)
(52) U.S. Cl. .................................................... 345/426
(58) Field of Classification Search ................ 345/422
See application file for complete search history.

(56) References Cited

U.S. PATENT DOCUMENTS

| | | | |
|---|---|---|---|
| 5,394,170 A | | 2/1995 | Akeley et al. |
| 5,729,672 A * | | 3/1998 | Ashton ........................ 345/589 |
| 5,854,631 A * | | 12/1998 | Akeley et al. ............... 345/419 |
| 6,002,412 A * | | 12/1999 | Schinnerer .................. 345/558 |
| 6,057,847 A * | | 5/2000 | Jenkins ........................ 345/422 |
| 6,384,822 B1 * | | 5/2002 | Bilodeau et al. ............ 345/422 |
| 6,498,605 B1 * | | 12/2002 | Abdallah ..................... 345/422 |
| 6,707,462 B1 * | | 3/2004 | Peercy et al. ................ 345/619 |

2004/0125103 A1 * 7/2004 Kaufman et al. ........... 345/419

OTHER PUBLICATIONS

Foley, James D. et al. Computer Graphics: Principles and Practices, Addison-Wesley Publishing Co., 2nd ed pp. 237-242 (1990).*
Crow, Franklin; Shadow Algorithms For Computing Graphics; Proc. of SIGGRAPH, 1977 pp. 242-248.
Everitt, Cass and Kilgard, Mark J.; Practical and Robust Stenciled Shadow Volumes for Hardware-Accelerated Rendering Mar. 12, 2002.
Kilgard, Mark J.; Improving Shadows and Reflections via the Stencil Buffer.
Lengyel, Eric; The Mechanics of Robust Stencil Shadows, Gamasutra, Oct. 11, 2002.

(Continued)

*Primary Examiner*—Mark Zimmerman
*Assistant Examiner*—Andrew Yang
(74) *Attorney, Agent, or Firm*—Townsend and Townsend and Crew LLP

(57) ABSTRACT

Lights can be conservatively bounded within a depth range. When image pixels are outside of a light's depth range, an associated volume fragment does not have to be rendered. Depth bounds registers can be used to store minimum and maximum depth values for a light. As graphics hardware processes volume fragments overlapping the image, the image's depth values are compared with the values in the depth bounds register. If the image's depth is outside of the depth range for the light, stencil buffer and illumination operations for this volume fragment are bypassed. This optimization can be performed on a per-pixel basis, or simultaneously on a group of adjacent pixels. The depth bounds are calculated from the light, or from the intersection of the volume with one or more other features. A rendering application uses API functions to set the depth bounds for each light and to activate depth bounds checking.

32 Claims, 9 Drawing Sheets

OTHER PUBLICATIONS

Real Shadows; Iris Universe http://developer.nvdia.com/docs/IO/2585/ATT/RealShadowsRealTime.pdf.

Segal, Mark and Akeley, Mark; The OpenGL Graphics System, A Specification (Version 1.3).

* cited by examiner

DEPTH BOUNDS TESTING

CROSS-REFERENCES TO RELATED APPLICATIONS

This application claims priority to U.S. Provisional Patent Application No. 60/451,311, filed Feb. 27, 2003, which is incorporated herein by reference for all purposes.

BACKGROUND OF THE INVENTION

The present invention relates to the field of computer graphics. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene.

Realistic and dynamic shadows are crucial for rendering high-quality computer graphics. Shadow volume rendering is one technique for generating shadows. A shadow volume defines a region of space that is in the shadow of a particular object (referred to as an occluder) with respect to a particular light source. Using shadow volumes turns the problem of rendering shadows from a lighting problem to a geometry problem. A shadow test determines whether all or a portion of an object is inside the shadow volume defined by an occluder and a light source. If all or a portion of an object is inside the shadow volume, then these portions are shadowed with respect to the particular light source. Conversely, if all or a portion of an object is outside the shadow volume of the occluder, as well all other occluder shadow volumes, then these portions are illuminated by the light source. The shadow test is repeated for each object and for every light source (and corresponding shadow volume) in a scene. The shadow test can be performed on a per-pixel basis or on a group of pixels in parallel.

As the demand for computer graphics, and in particular for real-time computer graphics, has increased, specialized hardware for accelerating the rendering process has become widespread. Hardware stencil buffers can be used to improve the performance of shadow volume algorithms. Stencil buffers can mask off portions of the rendered image in shadow from a particular light source. The unmasked portions of the rendered image are then re-rendered to add the illumination from the light source.

Due to the limitations of memory speed and bandwidth, pixel fill rate, which is the number of pixels that the graphics hardware can update in a given time period, is a critical bottleneck in graphics hardware performance. Because the computation of the mask in the stencil buffer requires rasterizing numerous shadow volume primitives and extensive reading and writing to the stencil buffer, rendering shadow volumes consumes tremendous amounts of pixel fill rate. This makes rendering dynamic shadows time-consuming and real-time rendering difficult for complex scenes.

It is desirable for computer graphics hardware to reduce the number of stencil buffer updates needed to render shadow volumes, thereby decreasing the pixel fill rate requirements and improving performance. It is further desirable that any optimization of shadow volume rendering requires little modification of the rendering application and results in correct images without artifacts or errors. Additionally, it is desirable for computer graphics hardware to reduce the number of stencil buffer updates needed to render other types of volumes, such as fog, smoke, constructive solid geometry, or collision detection.

BRIEF SUMMARY OF THE INVENTION

The performance of stenciled shadow volume algorithms can be improved by avoiding the rendering of unnecessary portions of shadow volumes into the stencil buffer. This reduces the amount of time spent rendering shadow volumes and decreases the memory bandwidth consumed by writing to the stencil buffer. Many light sources can be conservatively bounded within an effective depth range. For example, many light sources attenuate within a relatively small range. This range can be defined as a conservative depth bounds for the light source in a scene. During the rendering of shadow volumes into the stencil buffer, image fragments or pixels outside of a given light source's depth range are discarded and do not have to be rendered into the stencil buffer. This reduces the time and pixel fill rate spent on shadow volume rendering.

This improvement can be implemented in computer graphics hardware. Depth bounds registers can be used to store minimum and maximum depth values for a given light source. As the graphics hardware processes the pixels overlapping the shadow volume, the depth value associated with each pixel can be compared with the values in the depth bounds register. If the depth of the pixel is outside of the depth range for the light source, the stencil buffer operations for this portion of the shadow volume can be safely bypassed.

In an embodiment, an improved method for rendering a volume, such as a shadow volume or alternatively a constructive solid geometry object, includes rendering the scene to fill a depth buffer with depth values, setting a depth bounds associated with the volume, and defining a fragment associated with the volume, which has a volume depth and covers at least a portion of the pixels of the scene. A portion of the fragment covering the portion of the pixels is discarded when the depth value of the covered pixels is outside of the depth bounds associated with the volume. Conversely, further processing of the fragment continues when the depth value of the covered pixels is inside the depth bounds. This further fragment processing may (or may not if the fragment is discarded by subsequent fragment processing tests) result in the updating of the stencil, depth, color, or other values associated with the pixels not discarded by the depth bounds test.

In one embodiment, the depth value of the covered pixels is the depth value of a single pixel. Alternatively, the depth value of the covered pixels is the minimum and maximum depth values of a group of adjacent pixels. In this embodiment, a portion of the fragment covering the group of adjacent pixels is discarded when either the minimum depth value of the pixels in the group is greater than the maximum depth bounds value or the maximum depth value of the pixels in the group is less than the minimum depth bounds value.

In another embodiment, the depth bounds includes a minimum depth bounds value and a maximum depth bounds value outside of which the light source cannot potentially illuminate an object in the scene. An embodiment determines at least one of the depth bounds values by an attenuation of the light source. Another embodiment determines at least one of the depth bounds values by a view frustum. A third embodiment determines at least one of the depth bounds values by an object in the scene.

In another embodiment, the depth bounds associated with the volume is received from a rendering application via a function in an application programming interface (API).

BRIEF DESCRIPTION OF THE DRAWINGS

The present invention will be described with reference to the drawings, in which:

Although FIGS. 2, 4, 6A–6C, and 7 show two dimensional scenes for simplicity, it is understood that the present invention is intended for use in rendering three-dimensional scenes.

DETAILED DESCRIPTION OF THE INVENTION

Figure 1:
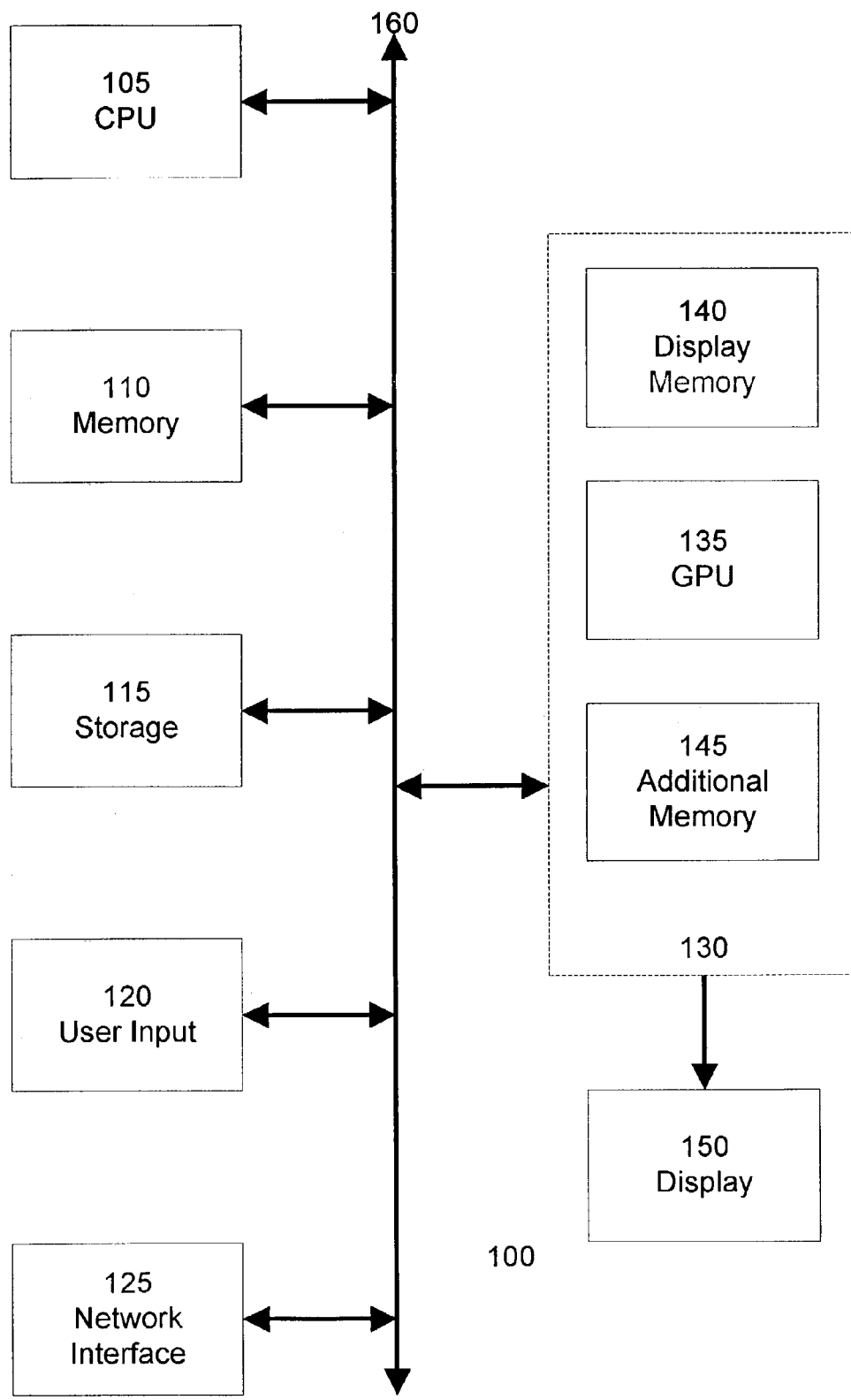
FIG. 1 illustrates a block diagram of a computer system suitable for practicing an embodiment of the invention.

FIG. 1 is a block diagram of a computer system 100, such as a personal computer, video game console, personal digital assistant, or other digital device, suitable for practicing an embodiment of the invention. Computer system 100 includes a central processing unit (CPU) 105 for running software applications and optionally an operating system. Memory 110 stores applications and data for use by the CPU 105. Storage 115 provides non-volatile storage for applications and data and may include fixed disk drives, removable disk drives, flash memory devices, and CD-ROM, DVD-ROM, or other optical storage devices. User input devices 120 communicate user inputs from one or more users to the computer system 100 and may include keyboards, mice, joysticks, touch screens, and/or microphones. Network interface 125 allows computer system 100 to communicate with other computer systems via an electronic communications network, and may include wired or wireless communication over local area networks and wide area networks such as the Internet. The components of computer system 100, including CPU 105, memory 110, data storage 115, user input devices 120, and network interface 125, are connected via one or more data buses 160.

A graphics subsystem 130 is further connected with data bus 160 and the components of the computer system 100. The graphics subsystem 130 includes a graphics processing unit (GPU) 135 and graphics memory. Graphics memory includes a display memory 140 (e.g., a frame buffer) used for storing pixel data for each pixel of an output image. Pixel data can be provided to display memory 140 directly from the CPU 105. Alternatively, CPU 105 provides the GPU 135 with data and/or instructions defining the desired output images, from which the GPU 135 generates the pixel data of one or more output images. The data and/or instructions defining the desired output images is stored in additional memory 145. In an embodiment, the GPU 135 generates pixel data for output images from instructions and data defining the geometry, lighting, shading, texturing, motion, and/or camera parameters for a scene.

Pixel data for each pixel in an output image may be divided among several different memory buffers. A color buffer stores color data for each pixel. Color data can be represented by three 8-bit color component values (for example red, green, and blue). An 8-bit alpha value may also be stored in the color buffer for each pixel for blending and transparency operations. A depth buffer stores a depth value for each pixel in an output image. The depth value of each pixel is used to determine the visibility of objects as they are rendered into the scene. In an embodiment, the depth value is a 24-bit number. A stencil buffer stores stencil values for each pixel in an output image. Stencil values are used to mask portions of the output image during rendering, and are used to render a variety of different effects, such as mirrors and shadows. The GPU 135 can read and write stencil values in the stencil buffer, and also perform increment, decrement, and reset operations on these values. In an embodiment, the stencil value is an 8-bit number.

In an embodiment of system 100, display memory 140 and/or additional memory 145 are part of memory 110 and is shared with the CPU 105. Alternatively, display memory 140 and/or additional memory 145 is one or more separate memories provided for the exclusive use of the graphics subsystem 130. The graphics subsystem 130 periodically outputs pixel data for an image from display memory 140 and displayed on display device 150. Display device 150 is any device capable of displaying visual information in response to a signal from the computer system.

Figure 2:
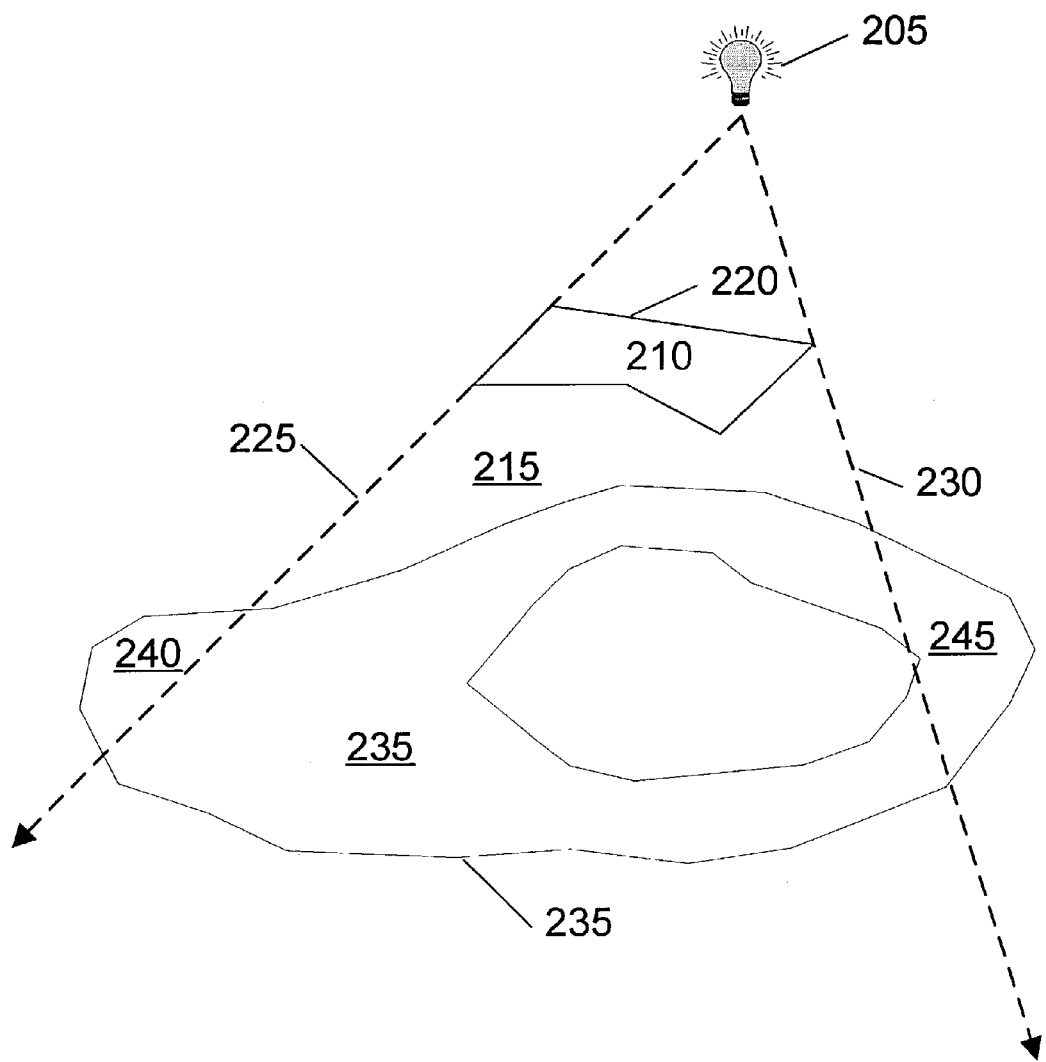
FIG. 2 illustrates an example shadow volume generated by a light source and an occluder.

FIG. 2 illustrates an example shadow volume generated by a light source 205 and an occluder 210. Light source 205 may be modeled as a point light source. However, more complicated light models, such as linear or area light sources are equally applicable to the present invention. Occluder 210 is any object or geometry capable of blocking light from light source 205, including static and dynamic objects. Shadow volume 215 is defined by projecting the silhouette 220 of the occluder 210 away from the light source 205. A silhouette of occluder 210 can be generated in numerous ways. For an occluder 210 composed of two or more polygons, a possible silhouette edge is defined where one polygon faces the light source 205 and an adjacent polygon faces away from the light source 205. One method of determining whether a polygon faces the light source is to compute the sign of the planar distance of the light source position from the plane of the shadow volume primitive using a plane equation. The possible silhouette edges are combined to form a possible silhouette edge set 220 of the occluder 210. These edges are said to be "possible silhouette edges" rather than simply "silhouette edges" because they may or may not correspond to the conventional notion of a silhouette—that is, the outline of an object from a given view.

The possible silhouette edge set 220 determines the "top" of the shadow volume 215. The sides of the shadow volume 215 are formed by projecting the possible silhouette edges 225 and 230 away the light source 205 to the edges of the silhouette 220. Projected possible silhouette edges 225 and 230 and possible silhouette edge set "top" 220 define the boundary representation of shadow volume 215. Shadow volume 215 may be an open volume, or alternately closed off with the addition of a surface (not shown) at a finite or infinite distance from the light source 205. This may be done to simplify rendering of shadow volumes when the viewer is within a shadow volume.

In FIG. 2, object 235 is partially within shadow volume 215. Object portions 240 and 245 are outside of the shadow volume 215 and illuminated by light source 205. Object portion 235 is inside shadow volume 215 and is unilluminated by light source 205. By determining the intersection of objects with shadow volumes created by a light source, realistic and dynamic shadows can be rendered. Hardware stencil buffers can be used to determine the intersection of objects with the shadow volumes from a light source on a per-pixel basis. This technique for using a stencil buffer to render scenes with shadow volumes is referred to as stenciled shadow volumes.

Figure 3:
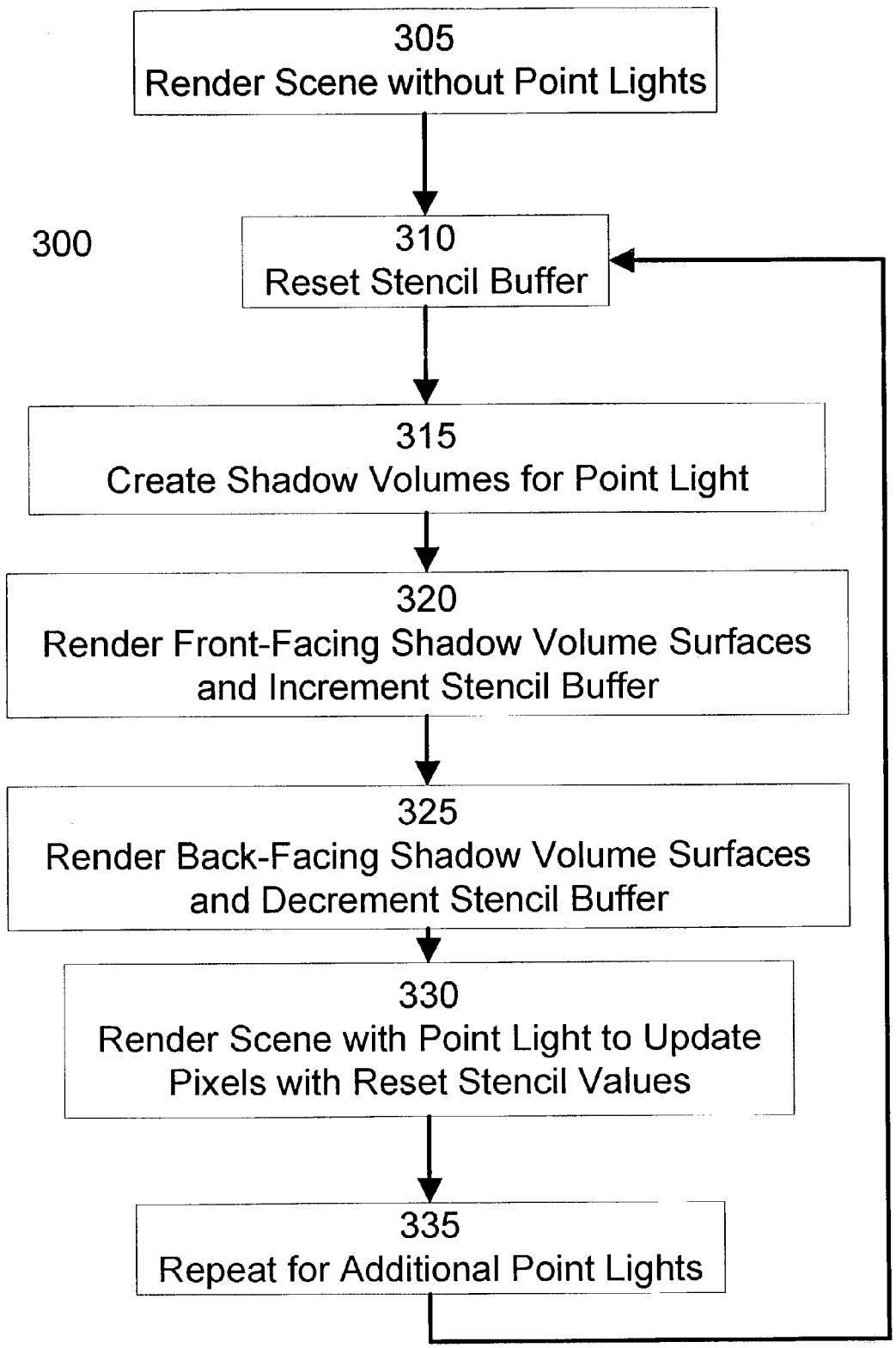
FIG. 3 illustrates a block diagram of a method for rendering a scene with stenciled shadow volumes.

FIG. 3 illustrates a block diagram of a method 300 for rendering a scene with stenciled shadow volumes. At step 305, the scene is rendered without any light sources (such as point, line, or area light sources). This step is performed to fill the depth buffer with the depth values for the scene. If there is ambient light in the scene, step 305 can simultaneously fill the color buffer with pixel data corresponding to the illumination from ambient light to the scene. Following step 305, step 310 resets the stencil values of the stencil buffer to zero.

Step 315 creates shadow volumes for a light source in a scene. Shadow volumes can be formed by finding occluders in the scene, computing the possible silhouette edge set of each occluder, and projecting these edges away from the light source. In complex scenes, a single light source may interact with several occluders to create a large number of shadow volumes.

Step 320 renders the front-facing shadow volume surfaces. "Front-facing" surfaces are the surfaces facing the viewer that define the boundaries of a shadow volume. One method of determining whether the surface faces the viewer is to compute the sign of the signed area of the shadow volume primitive in pixel coordinates. Step 320 renders the front-facing shadow volume surfaces in the scene, but does not draw the shadow volume surfaces into the color buffer, nor does it update the depth buffer. Instead, for each pixel of a shadow volume surface, step 320 compares the depth value associated with the pixel of the shadow volume surface with the corresponding pixel depth value stored for the output image in the depth buffer. If the shadow volume surface depth is less than the corresponding pixel depth value in the output image (i.e., the shadow volume surface pixel is in front of the pixel in the output image), step 320 increments the stencil value for this pixel. Conversely, if the shadow volume surface depth is greater than the corresponding pixel depth value, step 320 leaves the stencil buffer unchanged. Step 320 repeats this operation for all of the pixels of all of the front-facing shadow volume surfaces created by the light source, including front-facing shadow volume surfaces created from different occluders in the scene.

Step 325 renders the back-facing shadow volume surfaces. "Back-facing" surfaces are the shadow volume surfaces facing away from the viewer. As in step 320, step 325 does not does not draw the shadow volume surfaces into the color buffer. Step 320 compares the depth value associated with each pixel of a back-facing shadow volume surface with the corresponding pixel depth value stored for the output image in the depth buffer. If the shadow volume surface depth is less than the corresponding pixel depth value in the output image (i.e., the shadow volume surface pixel is in front of the pixel in the output image), step 325 decrements the stencil value for this pixel. Conversely, if the shadow volume surface depth is greater than the corresponding pixel depth value, step 325 leaves the stencil buffer unchanged. Step 325 repeats this operation for all of the pixels of all of the back-facing shadow volume surfaces created by the light source, including the back-facing shadow volume surfaces created from different occluders in the scene. Other approaches to updating the stencil buffer with equivalent outcomes are possible. For example, incrementing the stencil buffer for back-facing shadow volumes when the depth test fails, and decrementing the stencil buffer for front-facing shadow volumes when the depth tests fails has the same outcome though extra primitives to cap the shadow volume is required. This second approach is useful to avoid the shadow volume being clipped by the near clip plane.

Following the completion of steps 320 and 325, step 330 renders the scene with the light source. Step 330 fills the color buffer with the color values contributed by the illumination from the light source. During the rendering of the scene with the light source, step 330 reads the stencil value associated with each pixel in the output image. If a pixel's stencil value is zero and the depth value of the fragment matches the depth value of the pixel, step 330 adds the color values contributed by the illumination from the light source to the pixel in the color buffer. If there are color values previously stored in the color buffer, step 330 adds the illumination from the light source to the previously stored color values. Conversely, if the stencil value associated with a pixel in the output image is not zero, step 330 leaves the color values for this pixel unchanged. Essentially, the non-zero stencil buffer values "mask" pixels inside one or more shadow volumes from being illuminated by the light source, creating a realistic shadow.

Step 335 determines if there are any other light sources to be rendered in the scene. If there are other light sources, steps 310, 315, 320, and 330 are repeated for each light source, so that each light source contributes its illumination to the unmasked portions of the output image.

For scenes with complicated occluders, a single light source can generate a large number of shadow volumes. For example, a scene with a picket fence will have a separate shadow volume for each plank in the fence. In this example, there may be over 100 different shadow volumes. When rendering the front-facing and back facing shadow volume surfaces in this example, there may be over 200 stencil operations (increments or decrements) for each pixel in the scene. The tremendous amount of pixel fill rate required for such an extensive number of stencil operations limits the use of stenciled shadow volumes to relatively simple scenes, especially for real-time rendering applications.

Many light sources can be conservatively bounded within a specific range. For example, the intensity of a light source may attenuate to zero or a negligible value over a relatively short range. In this example, the illumination contribution from the light source to an object outside the range of the light source can be ignored regardless of whether the object is within a shadow volume created by the light source. Other features, such as scene geometry, the view frustum, or a clipping plane, can also be used to determine the range of a light source.

An embodiment of the present invention uses the range of a light source to avoid rendering unnecessary shadow volumes into the stencil buffer. In this embodiment, a depth range defining the minimum and maximum depth values is computed for a light source. The depth range represents the maximum range from the light source projected into the z or depth direction (relative to the viewer). Portions of the scene outside of a light source's depth range are unaffected by the light source. During the rendering of shadow volume surfaces into the stencil buffer, shadow volume surface fragments or pixels outside of a light source's depth range do not have to be rendered into the stencil buffer and are discarded. Similarly, during the rendering of a scene with a light source, image fragments or pixels outside of a light source's depth range do not have to be rendered into the color buffer and are discarded. This reduces the time and pixel fill rate spent rendering shadow volume surfaces and computing illumination values for pixels. Because the image fragments or pixels outside of a light source's depth range are, by definition of the depth range, unaffected by the light source, the appearance of the resulting output image is unchanged from an output image rendered using prior shadow volume rendering methods.

Figure 4:
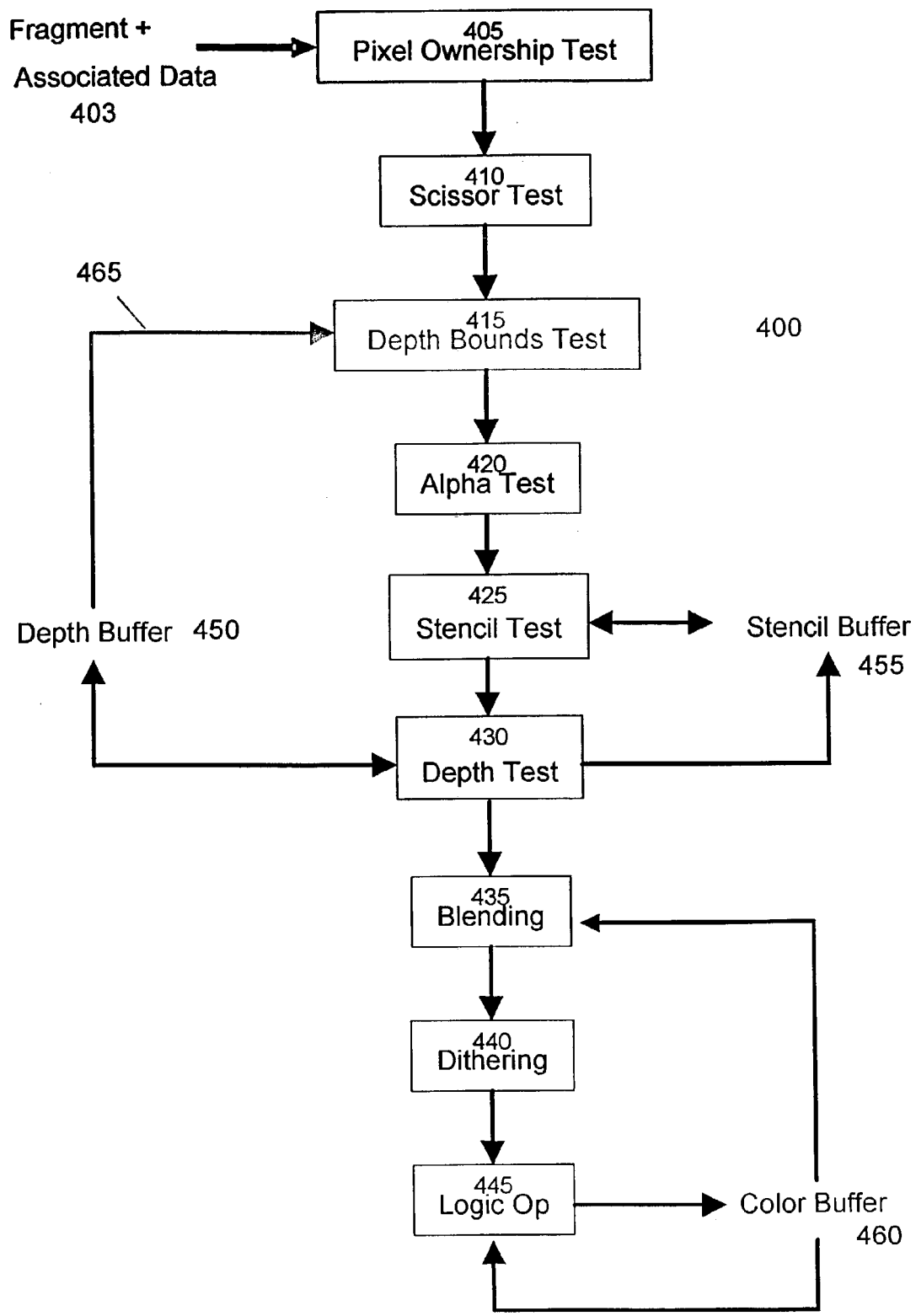
FIG. 4 illustrates a block diagram of an improved rasterization pipeline for rendering stenciled shadow volumes according to an embodiment of the invention.

An embodiment of the invention can be implemented in computer graphics hardware. FIG. 4 illustrates a block diagram of an improved rasterization pipeline 400 for rendering stenciled shadow volumes according to an embodiment of the invention. Rasterization pipeline 400 converts all or a portion of a geometric primitive, often a triangle or other convex polygon, into a corresponding set of pixel values in the color buffer 460, depth buffer 450, and/or stencil buffer 455. This conversion is referred to as rasterization. Rasterization pipeline can operate on a single pixel, or alternatively, a set of pixels simultaneously.

A fragment and associated data 403 representing all or a portion of a geometric primitive is first tested by pixel ownership unit 405 to determine whether the fragment is within the window or screen display area. Associated data includes color, lighting, texture, normal vector, and shader data defining the appearance of pixels within the fragment. Pixel ownership unit 405 discards portions of the fragment 403 outside of the window or screen display area.

If the fragment 403 is not completely discarded by pixel ownership unit 405, scissor test unit 410 tests the remaining portion of fragment 403 within an x and/or y range on the screen. A fragment or a portion thereof outside of the on-screen x and/or y range is discarded by scissor test unit 410. The on-screen x and/or y range is used by the scissor test unit 410 to define screen region where a scene is rendered.

If the fragment 403 is not completely discarded by scissor test unit 410, depth bounds testing unit 415 processes all of or the remaining portion of fragment 403. Depth bounds test unit 415 retrieves one or more depth values previously stored in the portion of the depth buffer corresponding to the portion of the screen covered by the fragment 403. Depth bounds test unit 415 then compares the retrieved depth value or values with depth bounds values stored in depth bound minimum and depth bound maximum registers. In an embodiment, the depth bounds values stored in the depth bound minimum and depth bound maximum registers are the minimum and maximum depth values associated with the maximum range from the light source projected into the z or depth direction (relative to the viewer).

If the retrieved depth value or values are outside the depth bounds (i.e. each retrieved depth value is either less than the value in the depth bound minimum register or greater than the value in the depth bound maximum register), then the pixel or pixels in the fragment do not need to be rendered and can be discarded. If all of the pixels in a fragment 403 are outside of the depth range, then the remaining units of the rasterization pipeline 400 can be skipped for the fragment 403.

In an embodiment, depth bounds test unit 415 retrieves a pair of depth values, referred to as z-cull values, associated with a group of adjacent pixels. The z-cull values represent the minimum and maximum depth values associated with the group of adjacent pixels. For example, a pair of z-cull values can represent the minimum and maximum depth values for a 4 by 4 group of adjacent pixels. Z-cull values are typically used to optimize depth testing, such as that performed by a depth test unit 430 discussed below. In this embodiment, the z-cull values are further used by depth bounds test unit 415 to quickly determine whether a group of adjacent pixels can be discarded by depth bounds test unit 415.

In this embodiment, if the minimum z-cull value for a group of pixels overlapping the fragment 403 is greater than the value in the depth bound maximum register, then all of the pixels in the group are behind the maximum depth bound and the portion of the fragment overlapping the group of pixels can be discarded. Similarly, if the maximum z-cull value for a group of pixels overlapping the fragment is less than the value in the depth bound minimum register, then all of the pixels in the group are in front of minimum depth bound and the portion of the fragment overlapping the group of pixels can be discarded. If the group of pixels is neither entirely behind nor entirely in front of the depth bounds stored in the depth bounds registers, in a further embodiment, the depth value for each pixel in the group is individually compared with the depth bounds values. Fragment pixels overlapping pixels in the depth buffer that are outside the depth bounds can be discarded, and if all of the pixels in a fragment 403 are discarded, then the remaining units of the rasterization pipeline 400 can be skipped for the fragment 403.

In an embodiment, the depth bounds values are determined by a rendering application. As discussed below, a rendering application can set depth bounds values according to a light source's attenuation properties, scene geometry, the view frustum, and/or a clipping plane. The rendering application sets the values of the depth bounds registers in depth bounds test unit 415 using an API, such as DirectX™ or OpenGL™. OpenGL™ is a cross-platform standard API for 3D rendering and 3D hardware acceleration. Microsoft DirectX™ is a Microsoft Windows-based API for running and displaying applications using multimedia elements such as full-color graphics, video, 3-D animation, and surround sound. Additionally, the rendering application enables or disables the depth bounds testing unit 415 using an API. In an embodiment, the rendering application communicates with the depth bounds testing unit 415 through one or more vendor-provided API extension functions, such as NV_depth_bounds_test. An alternative embodiment could, instead of allowing the application to enable or disable the depth bounds test operation, always perform depth bounds testing and rely on the application to set the minimum and maximum depth bounds to the minimum and maximum possible depth values when the intent is to have no fragments discarded by the depth bounds test.

The depth bounds testing unit 415 allows the rasterization pipeline 400 to skip fragment rendering when the depth values previously stored in the depth buffer are outside of the depth bounds values set in the depth bounds test unit 415. For scenes with light sources and shadow volumes that can be bounded to a limited depth range, the depth bounds test unit 415 allows a large number of stencil operations to be bypassed. Additionally, when rendering the scene with a light source, the depth bounds test unit 415 allows illumination computations for image fragments or pixels outside of a light source's depth range to be bypassed. The result is a reduction in the time and pixel fill rate required to render shadow volume surfaces and compute illumination values.

Additionally, an embodiment of the depth bound test unit 415 does not require any additional computational overhead or pixel fill rate to operate. In this embodiment, depth bounds test unit 415 reads depth values from the depth buffer 450 via read-only connection 465. Because these depth values are normally retrieved for the depth test unit 430, discussed below, the depth bounds test unit does not require any additional depth buffer reads. Further, because the depth bounds test unit 415 never modifies the depth values in the depth buffer 450, there is no increase in the number of writes to the depth buffer.

Following processing by depth bounds test unit 415, the remaining portion of fragment 403, if any, is processed by alpha test unit 420. Alpha test unit 420 determines if all or a portion of the fragment is visible due to alpha values associated with the fragment. Alpha is commonly used to model transparency of pixels; however, it can be used for other purposes.

The portion of the fragment 403 remaining after processing by alpha test unit 420 is processed by stencil test unit 425. Stencil test unit 425 masks all or a portion of the fragment from rendering according to a stencil value stored in the stencil buffer 455. Additionally, stencil test unit 425 can modify the stencil values stored in the stencil buffer 455.

Following processing by stencil test unit 425, the remaining portion of fragment 403, if any, is processed by depth test unit 430. Depth test unit 430, not to be confused with depth bounds test unit 415, determines the visibility of the remaining fragment or pixels with respect to previously stored values in the depth buffer 450. A fragment or pixel having a depth value greater than the depth value from a corresponding portion of the depth buffer 450 are not visible in the scene and does not need to be rendered. Conversely, a fragment or pixel having a depth value less than the depth value from a corresponding portion of the depth buffer 450 is visible and needs to be rendered. Furthermore, the depth value associated with each visible fragment or pixel is stored in the corresponding portion of the depth buffer 450, overwriting the previously stored depth value. This ensures that future visibility determinations for additional fragments or pixels will be performed on the correct depth values.

Additionally, depth test unit 430 can optionally perform stencil operations on pixels, such as increments or decrements of the pixel's corresponding stencil value, in response to the visibility determination of the fragment or pixel. This feature can be used, for example, when rendering front-facing or back-facing shadow volume surfaces, as discussed in method 300.

The portion of the fragment 403 remaining after processing by depth test unit 430 is then drawn into the color buffer 460 by blending unit 435, dithering unit 440, and logic op unit 445. The blending unit 435 blends the pixel's or fragment's color values with the color values previously stored in the color buffer 460. The dithering unit 440 and the logic op unit 445 determine the color value associated with the pixel or fragment to be drawn, and store the final color value in the color buffer 460.

The rasterization pipeline 400 illustrates the implementation of the invention in example rasterization hardware. Other embodiments of the invention may use different rasterization hardware that includes alternative or additional functions than shown in example rasterization pipeline 400. Furthermore, the functional units of the rasterization pipeline can be performed in various orders. However, it is preferable from a performance standpoint that functional units that potentially discard large numbers of pixels or entire fragments, such as the pixel ownership test unit 405, the scissor test unit 410, and the depth bounds test unit 415, be performed earlier in the pipeline to avoid unnecessary computations for pixels or fragments.

In an further embodiment, the depth bounds test 415 can be combined with conventional scissor testing to further limit the rasterization and fragment processing overhead required for rendering with shadow volumes. The scissor test 410 discards fragments outside of rectangle specified with pixel positions. The depth bounds test and scissor are similar in that they reject fragments outside ranges. The scissor test operates on the X and Y pixel positions of fragments while the depth bounds test operates on the Z pixel position (depth) of fragments.

Figure 5:
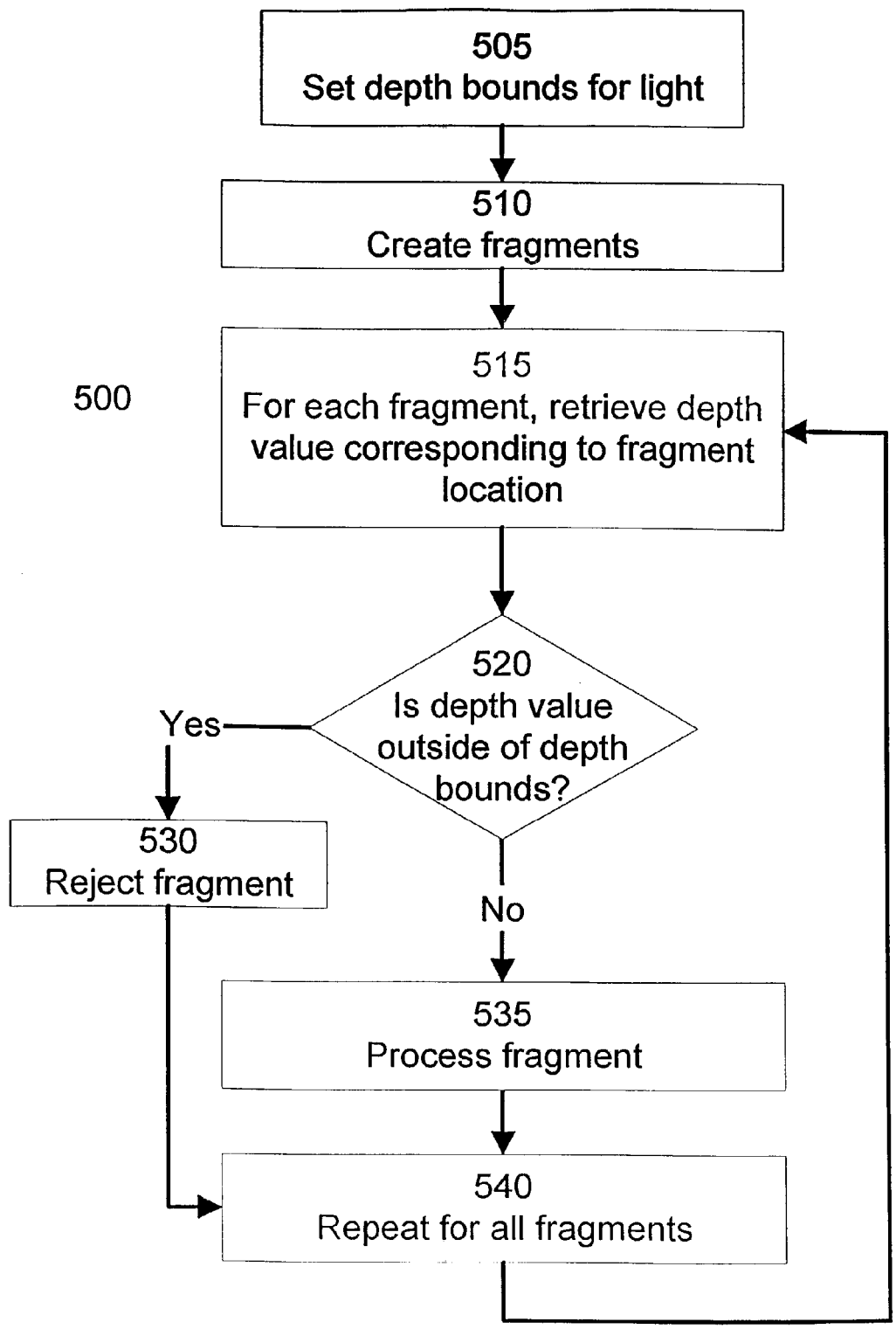
FIG. 5 illustrates a block diagram of a method for rendering a shadow volume according to an embodiment of the invention.

An embodiment of the invention can be used to optimize the rendering of scenes with stenciled shadow volumes. In this embodiment, a depth bounds is associated with each light source used to cast a shadow in a scene. FIG. 5 illustrates a block diagram of a method 500 for optimizing the rendering a shadow volume according to this embodiment of the invention. Rendering the scene with stenciled shadow volumes is performed generally in a manner similar to method 300, with method 500 defining the improvements to method 300 according to this embodiment of the invention.

Step 505 sets a depth bounds for a light source. The depth bounds for a light source are set prior to rendering the front-facing shadow volume surfaces, the back-facing shadow volume surfaces, and the scene with illumination from the light source. If there are multiple light sources, step 505 is repeated for each light source prior to rendering its associated shadow volume surfaces and illumination contribution to the scene. In an embodiment, step 505 loads depth bounds values for the light source into the depth bounds test unit 415 as described above. In another embodiment, the depth bounds values are determined by a rendering application. Examples of different depth bounds determinations are discussed in detail below.

Steps 510 to 540 optimize the processing of fragments when rendering stenciled shadow volumes. In an embodiment, steps 510 to 540 are repeated for each of rendering steps 320, 325, and 330 in method 300. Step 510 creates fragments to be processed. When step 510 is performed for steps 320 or 325, fragments are created from the geometry of shadow volume surfaces. Step 510 creates fragments from the scene geometry when step 510 is performed for step 330. Step 510 may create numerous fragments depending upon the amount of screen space occupied by the geometry.

Step 515 retrieves the previously-stored depth value from portion of the depth buffer covered by the fragment. As discussed above, depth values for the scene are stored in the depth buffer in step 305, where the scene is rendered with disabled light sources. Step 515 retrieves a depth value corresponding to each pixel in the fragment. In a further embodiment, step 515 retrieves z-cull values for one or more groups of adjacent pixels from the portion of the depth buffer covered by the fragment.

Step 520 compares the retrieved depth values with the depth bounds set for the light source in step 505. If the retrieved depth values are outside of the depth bounds, (i.e. the depth value is greater than the maximum depth bound or less than the minimum depth bound), step 530 discards the fragment from the rasterization pipeline. If only a portion of the fragment is outside the depth bounds, then step 530 discards only this portion of the fragment. The remaining portion of the fragment is processed according to step 535, discussed below.

In a further embodiment, step 520 first compares the z-cull values for one or more groups of adjacent pixels in the fragment. If the minimum z-cull value for a group of pixels in a fragment is greater than the maximum depth bound, or if the maximum z-cull value for a group of pixels in a fragment is less than the minimum depth bound, then all of the pixels in the group are outside the depth bounds and the corresponding portion of the fragment can be discarded in step 530. If the group of pixels is not either entirely behind or in front of the depth bounds, step 520 compares the individual pixel depth values with the depth bounds.

For a fragment either wholly or partially within the depth bounds, step 535 processes the portion of the fragment within the depth bounds. In an embodiment, fragment processing includes some or all of the functions described by fragment processing pipeline 400. As step 535 processes a fragment created from front-facing shadow volume surfaces, such as when step 535 is performed for step 320, step 535 increments the stencil values corresponding to the area of the screen covered by the fragment. Similarly, as step 535 processes a fragment created from a back-facing shadow volume surface, such as when step 535 is performed for step 325, step 535 decrements the stencil values corresponding to the fragment. As step 535 processes a fragment created from scene geometry, such as when step 535 is performed for step 530, step 535 computes a color value for each pixel in the fragment with a stencil value of zero based upon the illumination of the scene geometry by the light source and then stores the color values in the color buffer.

After either processing all or a portion of a fragment in step 535 or discarding all or a portion of a fragment in step 530, step 540 determines if there are any additional fragments remaining to be processed. Steps 515 to 535 are repeated for any remaining fragments.

Method 500 illustrates that the present invention can be easily integrated into rendering applications using prior stenciled shadowed rendering techniques. In many cases, rendering applications previously using a prior stenciled shadow volume technique can be easily modified to employ the present invention. For example, a rendering application used in conjunction with rasterization pipeline 400 only needs the addition of steps to set the depth bounds for each light source and to enable the depth bounds test unit 415 in order to employ the present invention.

Figure 6A:
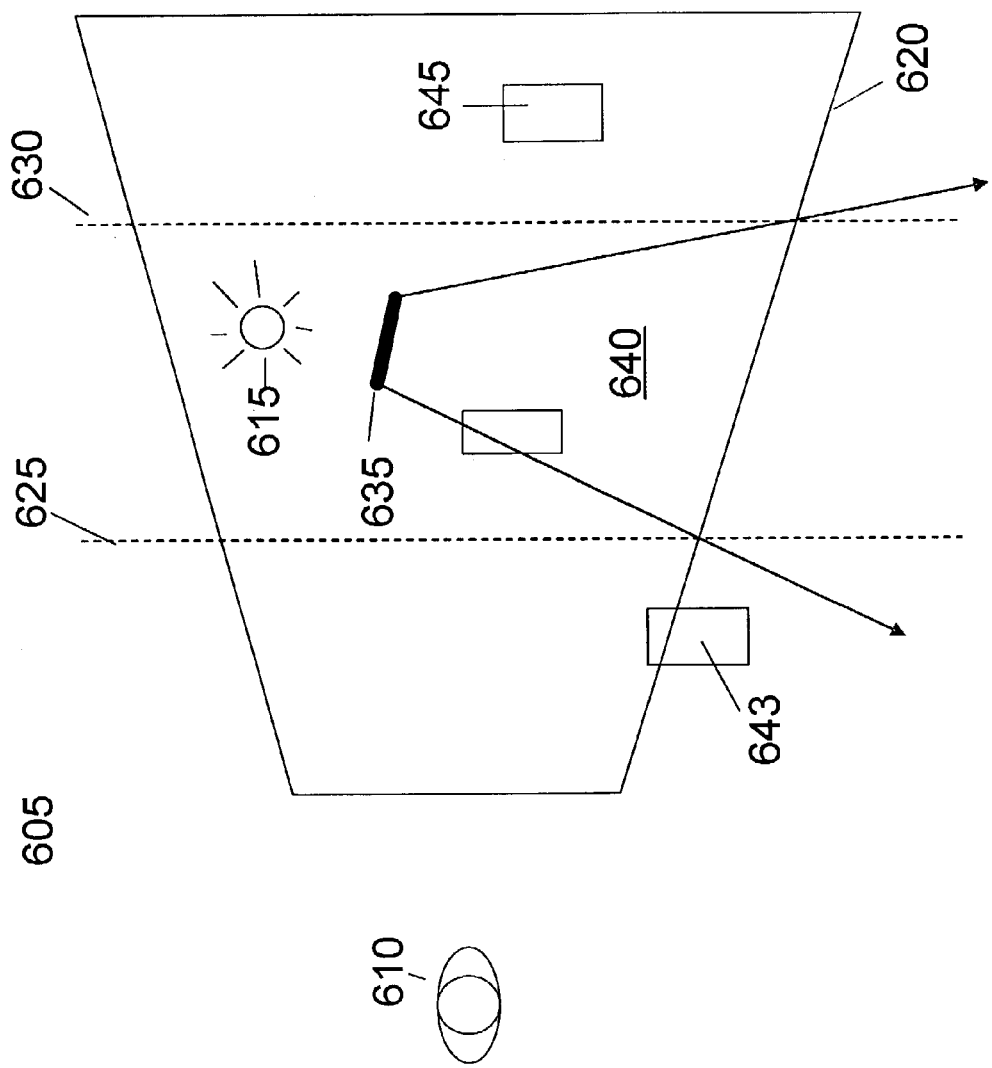
FIGS. 6A, 6B, and 6C illustrate examples of depth bounds for use with an embodiment of the invention.
Figure 6B:
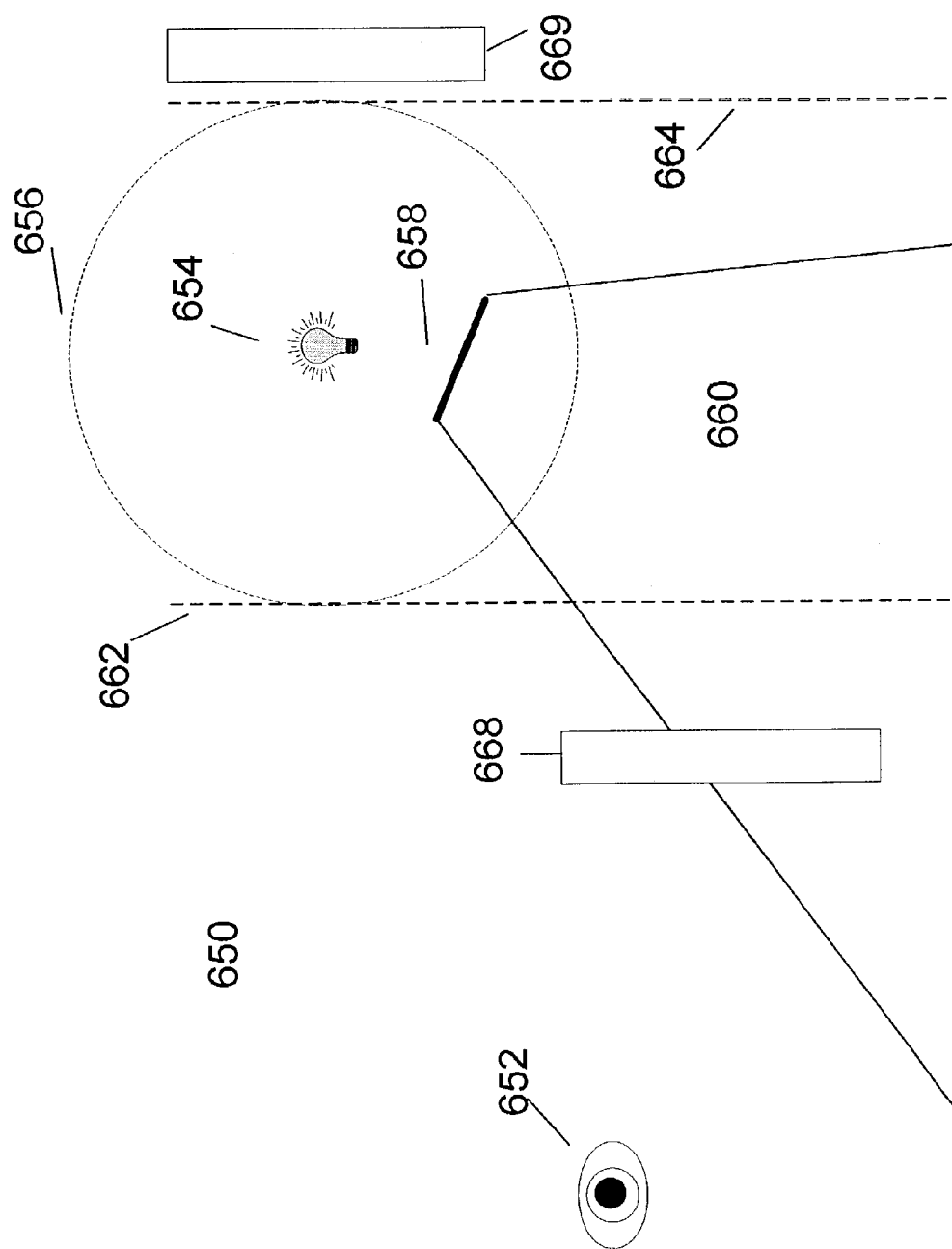
Figure 6C:
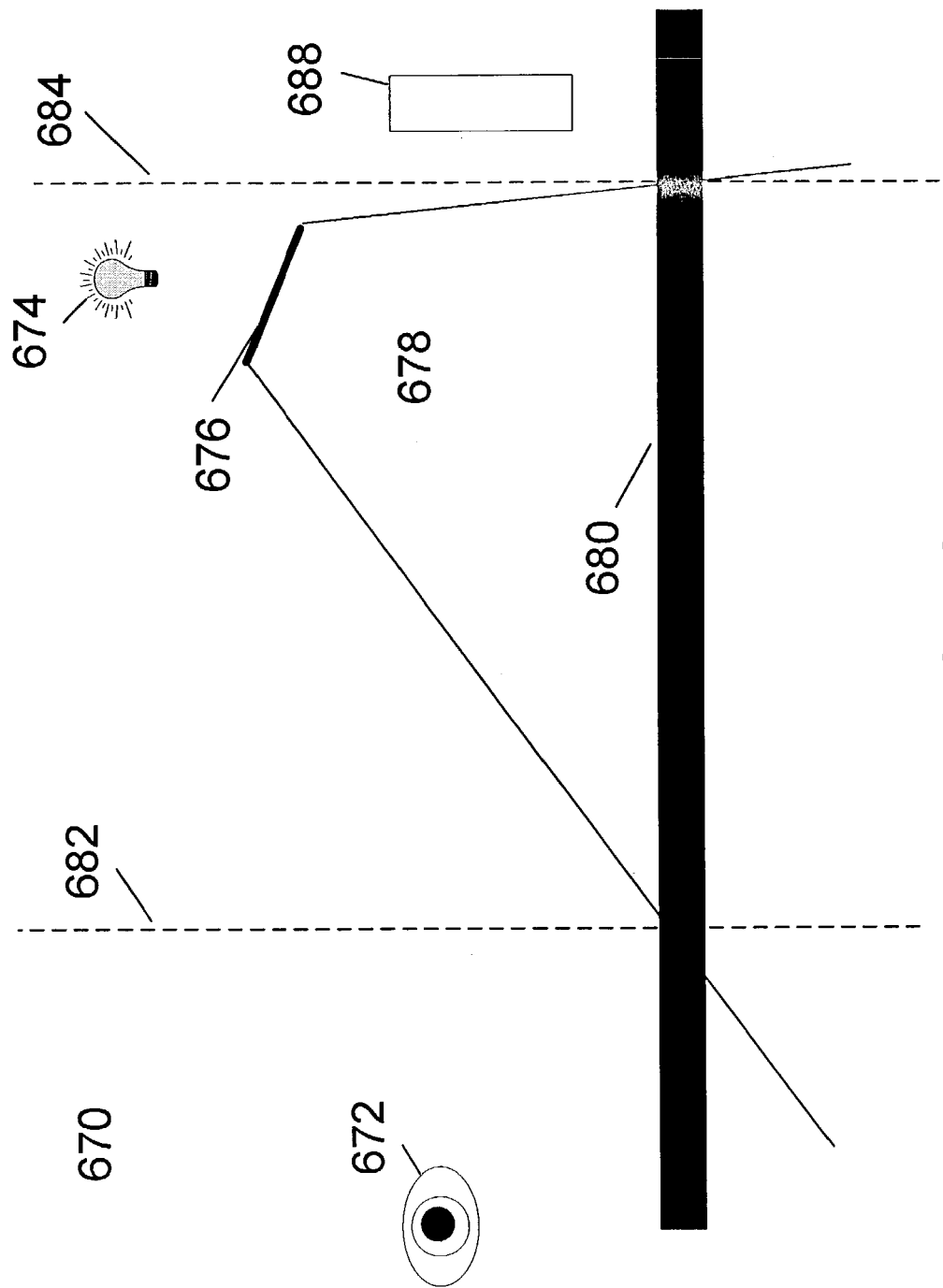

FIGS. 6A, 6B, and 6C illustrate examples of depth bounds for use with an embodiment of the invention. Scene 605 in FIG. 6A includes a viewer 610, a light source 615, and an occluder 635. The interaction between the light source 615 and the occluder 635 define a shadow volume 640. The viewer's position, orientation, and field of view define a view frustum 620, which is the portion of the scene capable of being seen by the viewer 610.

The shadow volume 640 intersects the view frustrum 620 at two places. These intersections form a front depth bounds plane 625 and a rear depth bounds plane 630. Portions of the scene 605 outside of the depth bounds planes 620 and 630 are outside of the shadow volume 640 (or inside the shadow volume 640 but outside of the view frustum 620, and therefore not visible to the viewer). Because any scene geometry outside of the depth bounds planes, such as geometry 643 and 645, cannot be shadowed, there is no need to compute any illumination or shadowing on this geometry from light source 615. In this example, the surfaces of the shadow volume 640 overlapping geometry 645 do not have to be rendered into the stencil buffer and can be discarded.

Scene 650 in FIG. 6B includes a viewer 652, a light source 654, and an occluder 658. Light source 654 attenuates over a relatively short radius. This defines the effective range 656 of the light source 654. The light source 654 cannot illuminate (or cast a shadow) on scene geometry outside of the effective range 656. The interaction between the light source 654 and the occluder 658 define a shadow volume 660.

In this example, the depth bounds are set to the minimum depth 662 and the maximum depth 664 of the effective range 656 of the light source 654. Scene geometry outside of this depth bounds, such as geometry 668 or 669, cannot be lit or shadowed by the light source 654, regardless of whether the geometry is inside or outside shadow volume 660. Therefore, the portions of the shadow volume 660 overlapping scene geometry outside of the depth bounds, such as geometry 668 and 669, do not need to be rendered into the stencil buffer and can be discarded. Similarly, geometry 668 and 669 are not illuminated by light source 654. Therefore, rendering the illumination from light source 654 can be bypassed for scene geometry outside of the depth bounds, such as 668 and 669.

Scene 670 in FIG. 6C includes a viewer 672, a light source 674, and an occluder 676. The interaction between the light source 674 and the occluder 676 define a shadow volume 678. Shadow volume 678 intersects scene geometry 680, which can be a wall, floor, or other geometric feature in the scene. In this example, the intersection of the shadow volume 678 with scene geometry 680 defines a minimum depth bound 682 and a maximum depth bound 684. In this example, geometry 688 cannot be shadowed by this shadow volume. Therefore, the shadow volume surfaces for shadow volume 678 that overlap geometry 688 do not need to be rendered into the stencil buffer and can be discarded. In contrast, prior stenciled shadow volume rendering methods would require both the front-facing and back-facing shadow volume surfaces that overlap geometry 688 to be rendered into the stencil buffer.

In other embodiments, the example depth bounds computations shown in FIGS. 6A, 6B, and 6C can be combined to compute the depth bounds for a light source. For example, a minimum depth bounds may be set according to the effective range of a light source, while a maximum depth bounds may be set according to the scene geometry. In computing the depth bounds for a light source, a rendering application may compute several potential depth bounds values using alternative methods and select the optimum values for the minimum and maximum depth bounds values. Additionally, if the light source interacts with two or more occluders, then the rendering application may compute the depth bounds separately for each shadow volume associated with the light source. The rendering application can then select the depth bounds values that define the minimum and maximum depth values for the entire set of shadow volumes associated with the light source.

Figure 7:
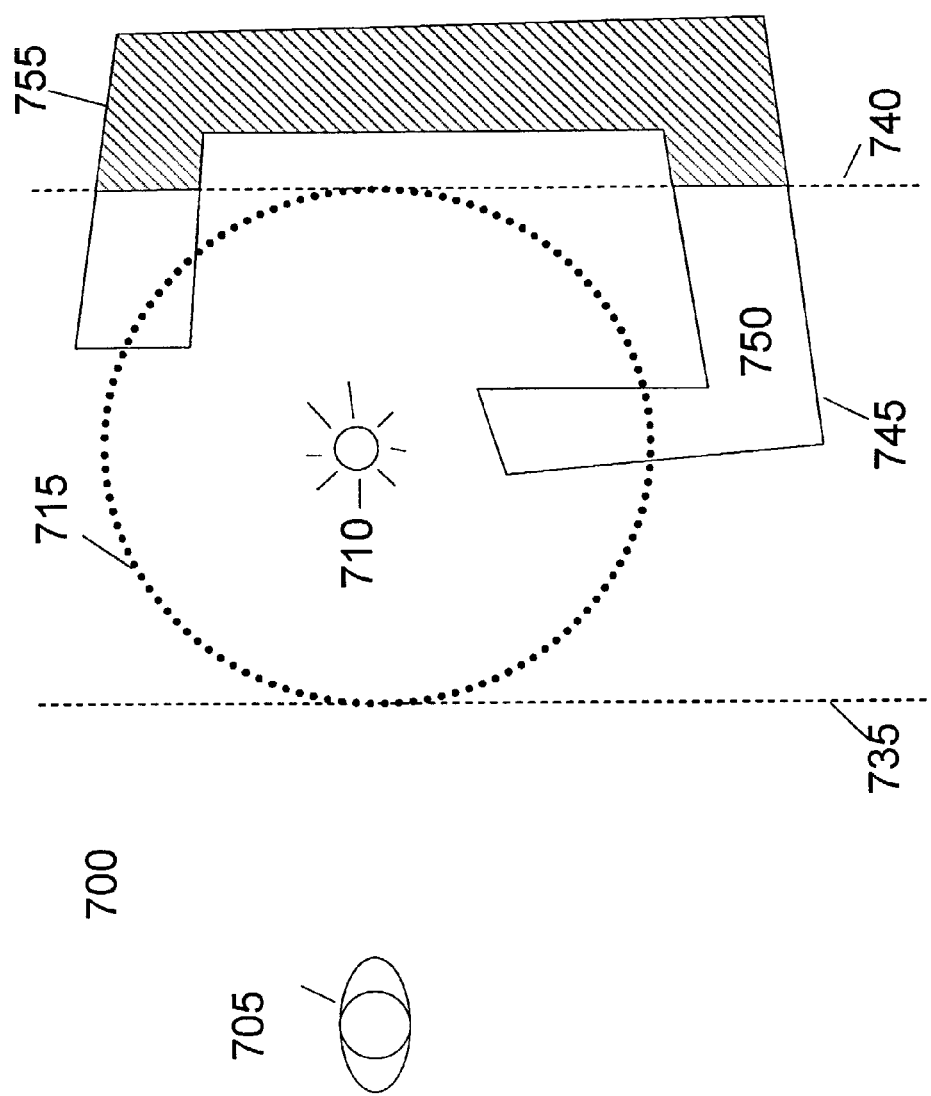
FIG. 7 illustrates an example of the efficiencies realized by an embodiment of the invention over conventional stenciled shadow volume rendering.

FIG. 7 illustrates an example of the efficiencies realized by an embodiment of the invention over conventional stenciled shadow volume rendering. Scene 700 includes a viewer 705 and a light source 710. For clarity, occluders are omitted from this example; however, scene 700 may include any number of occluders and associated shadow volumes. Light source 710 has an effective range 715 that is used in this example to set the minimum depth bounds 735 and the maximum depth bounds 740. Scene geometry outside of this depth bounds cannot be lit or shadowed by the light source 710, regardless of whether the geometry is inside or outside a shadow volume.

Geometry 745 is has a first portion 750 located within the depth bounds of light 710. A second portion 755 of object 745 is outside of the depth bounds of light 710. When rendering the front-facing and back-facing surfaces of any shadow volumes, the portions of the shadow volume overlapping scene geometry outside of the depth bounds, such as the shaded portion 755 of geometry 745, do not need to be rendered into the stencil buffer and can be discarded. Illumination calculations for geometry outside the shadow volume can similarly be skipped, as discussed above.

As can be seen by comparing the relative sizes of portions 750 and 755 of geometry 745, the addition of depth bounds testing eliminates a large amount of the stencil operations and illumination calculations needed to render stenciled shadow volumes. The performance improvements in shadow volume rendering resulting from the present invention will vary depending on many factors, including the complexity of the scene and the number of light sources. In rendering applications with complex occluders, numerous shadow volumes, and multiple light sources, performance can be improved anywhere from 5% to 25% using depth bounds testing. Other implementations of the present invention will result in different performance gains.

In a further embodiment, the depth bounds test unit can compute a depth bounds value based on a plane equation. In this embodiment, the rendering application specifies the parameters of a plane equation, for example, the values of A, B, C, and D in the standard plane equation $Ax+By+Cz=D$. Using a plane equation, rather than a constant depth bounds value, allows shadow volumes to be conservatively bounded with planes that are not parallel to the image plane. This allows shadow volumes to be more "tightly" bounded and increases the performance of the depth bounds test.

Although the invention has been discussed with respect to specific embodiments thereof, these embodiments are merely illustrative, and not restrictive, of the invention. Depth bounds testing can be used in any application that requires testing for the intersection of two or more volumes. For example, although the invention is discussed with reference to shadow volumes, it can be used to optimize the rendering of constructive solid geometry (CSG) rendering or to perform collision detection. Thus, the scope of the invention is to be determined solely by the claims.

What is claimed is:

1. A method for rendering a volume within a scene, comprising:
   rendering a set of pixels of the scene to fill a depth buffer with depth values associated with the set of pixels;
   setting a depth bounds associated with the volume;
   defining a fragment associated with the volume, having a volume depth, and covering at least one subset of pixels of the scene, wherein each subset of pixels has a subset depth value;
   for each subset of pixels, discarding at least a portion of the fragment covering the subset of pixels in response to the corresponding subset depth value being outside of the depth bounds associated with the volume;
   for each subset of pixels, processing at least a portion of the fragment covering the subset of pixels in response to the corresponding subset depth value being inside of the depth bounds associated with the volume; and
   displaying an image based on said rendered pixels
   wherein the volume is a shadow volume associated with a light source.

2. The method of claim 1, wherein processing at least a portion of the fragment comprises storing a value in a stencil buffer.

3. The method of claim 2, wherein processing at least a portion of the fragment comprises storing a value in a stencil buffer in response to a comparison between the subset depth value and the volume depth.

4. The method of claim 1, wherein the subset of pixels is a single pixel.

5. The method of claim 1, wherein the subset of pixels includes a group of adjacent pixels.

6. The method of claim 5, wherein the subset depth value includes the minimum and maximum depth values of the pixels in the group, and wherein the depth bounds includes a minimum depth bounds value and a maximum depth bounds value.

7. The method of claim 6, wherein discarding further comprises:
   discarding the portion of the fragment covering the group of adjacent pixels in response to either the minimum depth value of the pixels in the group being greater than the maximum depth bounds value or the maximum depth value of the pixels in the group being less than the minimum depth bounds value.

8. The method of claim 1, wherein the depth bounds includes a minimum depth bounds value and a maximum depth bounds value outside of which the light source cannot potentially illuminate an object in the scene.

9. The method of claim 8, wherein at least one of the depth bounds values is determined by an attenuation of the light source.

10. The method of claim 8, wherein at least one of the depth bounds values is determined by a view frustum.

11. The method of claim 8, wherein at least one of the depth bounds values is determined by an object in the scene.

12. The method of claim 8, further comprising:
    determining a horizontal bounds and a vertical bounds associated with the volume;
    for each subset of pixels further including a subset horizontal value, discarding at least a portion of the fragment covering the subset of pixels in response to the corresponding subset horizontal value being outside of the horizontal bounds associated with the volume; and
    for each subset of pixels further including a subset vertical value, discarding at least a portion of the fragment covering the subset of pixels in response to the corresponding subset vertical value being outside of the vertical bounds associated with the volume.

13. The method of claim 1, wherein setting a depth bounds associated with the volume further comprises receiving depth bounds values from a rendering application via a function in an API.

14. The method of claim 13, wherein the API is a cross-platform standard API for 3D rendering and 3D hardware acceleration.

15. The method of claim 2, wherein storing at least one value in a stencil buffer includes incrementing a stencil value previously stored in the stencil buffer and overwriting the previously stored stencil value with the incremented stencil value.

16. The method of claim 2, wherein storing at least one value in a stencil buffer includes decrementing a stencil value previously stored in the stencil buffer and overwriting the previously stored stencil value with the decremented stencil value.

17. The method of claim 1, further comprising the steps of:
    defining at least one scene fragment associated with the set of pixels of the scene and;
    for each scene fragment, discarding at least a portion of the scene fragment associated with a subset of pixels having a subset depth value in response to the subset depth value being outside of the depth bounds associated with the volume; and for each scene fragment, storing at least one value in a color buffer in response to the subset depth value associated with the scene fragment being inside the depth bounds.

18. The method of claim 17, wherein the value stored in the color buffer is an illumination contribution from a light source associated with the volume.

19. A graphics processing system, comprising:
a depth buffer configured to store depth values associated with a set of pixels in a scene;
a stencil buffer configured to store stencil values associated with the set of pixels in the scene;
a depth bounds register configured to define a range of depths associated with a volume; and
a graphics pipeline adapted to process a fragment associated with the volume and covering a subset of the pixels in the scene, wherein the graphics pipeline is configured to discard the fragment in response to a depth value associated with the subset of pixels being outside the range of depths defined by the depth bounds register, and further configured to store a value in the stencil buffer in response to the depth value associated with a further subset of the subset of pixels being inside the range of depths defined by the depth bounds; and
wherein the volume is a shadow volume associated with a light source.

20. The graphics processing system of claim 19, wherein the subset of pixels is a single pixel, and the depth value associated with the subset of pixels is the depth value associated with the pixel.

21. The graphics processing system of claim 19, wherein the depth bounds register is adapted to store a minimum depth bounds value and a maximum depth bounds value.

22. The graphics processing system of claim 21, wherein the subset of pixels includes a group of adjacent pixels, and the depth value associated with the subset of pixels includes the minimum and maximum pixel depth values for the group of pixels.

23. The graphics processing system of claim 19, wherein the graphics pipeline is further adapted to process a scene fragment associated with a scene, wherein the graphics pipeline is configured to discard at least a portion of the scene fragment associated with a subset of pixels and having a subset depth value in response to the subset depth value being outside the range of depths defined by the depth bounds register, and further configured to store at least one value in a color buffer in response to the subset depth value associated with the scene fragment being inside the range of depths defined by the depth bounds register and not discarded by other fragment tests.

24. The graphics processing system of claim 19, further comprising:
a depth bounds testing unit adapted to compare the range of depths defined by the depth bounds register with a depth value from the depth buffer and associated with at least one pixel in the scene; and
a read-only data connection between the depth bounds testing unit and the depth buffer, such that the depth bounds testing unit can read a depth value from the depth buffer.

25. A method for a rendering application to configure the operation of a graphics processing system, comprising:
adapting a function to allow a rendering application to set at least one depth bound value for the graphics processing system; and displaying an image based on said rendered pixels
wherein the depth bound value is associated with a light source.

26. The method of claim 25, further comprising:
adapting a second function to allow a rendering application to instruct the graphics processing system to discard a fragment in response to a depth value for a subset of pixels being outside of the depth bound value; and instructing the graphics processing system to perform an alternate operation in response to the depth value for a subset of pixels being inside the depth bound value.

27. The method of claim 25, wherein the alternate operation is a stencil buffer operation.

28. The method of claim 25, wherein the alternate operation includes storing a value in a color buffer.

29. The method of claim 25 wherein the depth bound value is determined by an attenuation of the light source.

30. The method of claim 25 wherein the depth bound value is determined by a view frustum.

31. The method of claim 25 wherein the depth bound value is determined by an object in a scene.

32. A graphics processing system comprising:
a depth buffer configured to store depth values associated with a set of pixels in a scene;
a stencil buffer configured to store stencil values associated with the set of pixels in the scene;
a depth bounds register configured to define a range of depths associated with a volume;
a graphics pipeline adapted to process a fragment associated with the volume and covering a subset of the pixels in the scene, wherein the graphics pipeline is configured to discard the fragment in response to a depth value associated with the subset of pixels being outside the range of depths defined by the depth bounds register, and further configured to store a value in the stencil buffer in response to the depth value associated with a further subset of the subset of pixels being inside the range of depths defined by the depth bounds register; and
wherein the depth bound register further comprises minimum and maximum depth values associated with the maximum range from the light source projected into a depth direction relative to a viewer.

* * * * *